(No Model.)
2 Sheets—Sheet 1.
F. N. ETHRIDGE.
HEEL TRIMMING MACHINE.
No. 391,306. Patented Oct. 16, 1888.
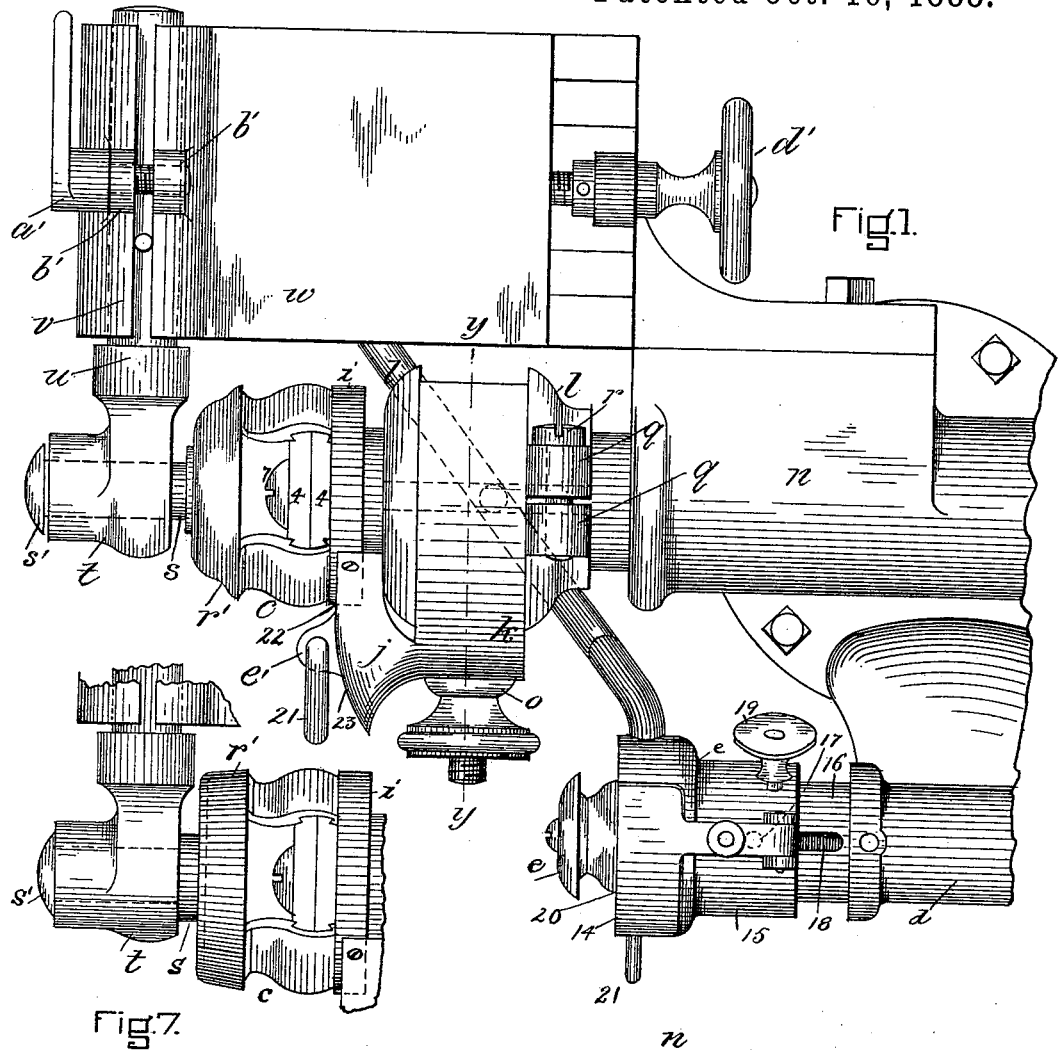
Fig.1.
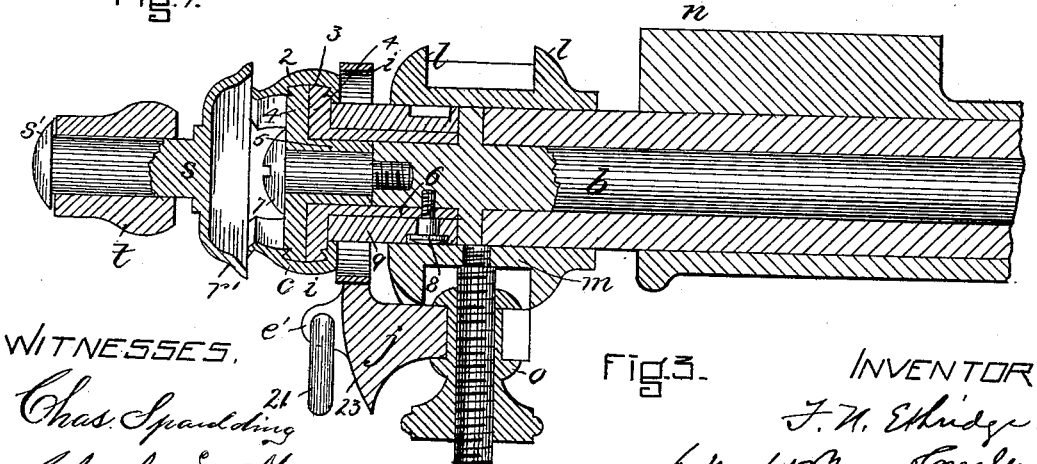
Fig.7.
Fig.3.
WITNESSES.
Chas. Spaulding
Charles O. Moss.
INVENTOR.
F. N. Ethridge.

(No Model.) 2 Sheets—Sheet 2.
F. N. ETHRIDGE.
HEEL TRIMMING MACHINE.
No. 391,306. Patented Oct. 16, 1888.
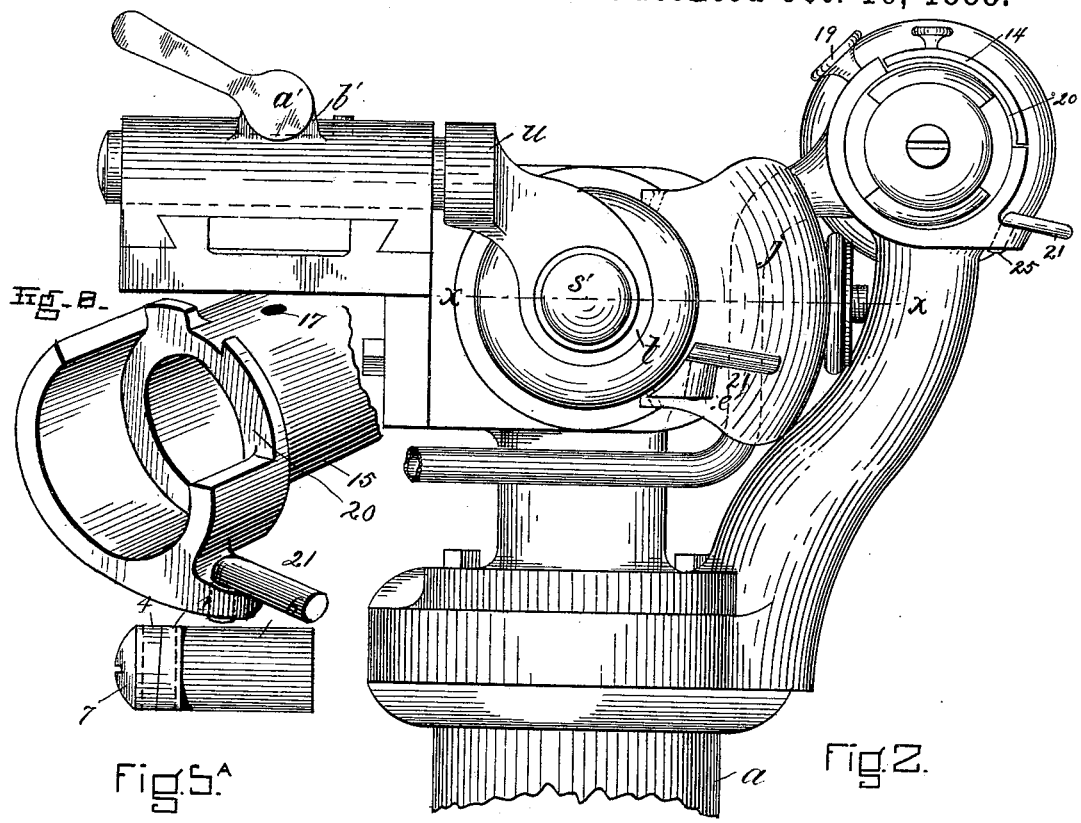
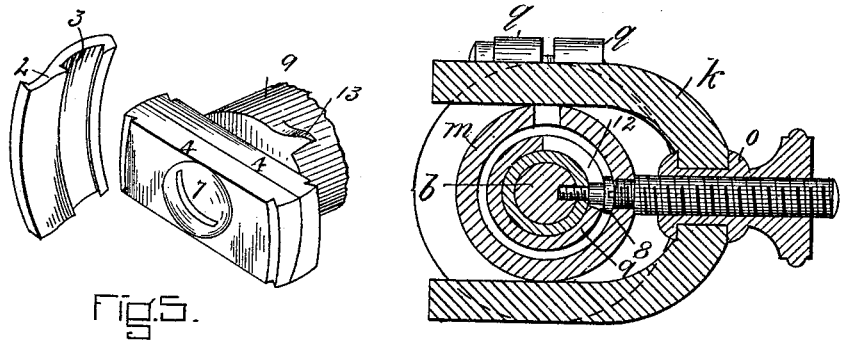
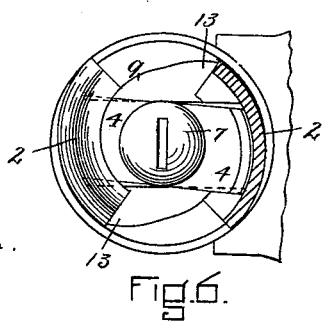
WITNESSES.
Chas. Spaulding.
Charles E. Moss.
INVENTOR.
F. N. Ethridge

United States Patent Office.

FRANK N. ETHRIDGE, OF LYNN, MASSACHUSETTS, ASSIGNOR TO THE ACME HEEL TRIMMER COMPANY, OF NASHUA, NEW HAMPSHIRE.

HEEL-TRIMMING MACHINE.

SPECIFICATION forming part of Letters Patent No. 391,306, dated October 16, 1888.

Application filed June 8, 1888. Serial No. 276,483. (No model.)

*To all whom it may concern:*

Be it known that I, FRANK N. ETHRIDGE, of Lynn, in the county of Essex and State of Massachusetts, have invented certain new and useful Improvements in Heel-Trimming Machines, of which the following is a specification.

This invention consists in certain improvements in heel-trimming machines, whereby the presentation of the heel to the rotary cutter is improved and other advantages obtained, as I will now proceed to describe and claim.

Of the accompanying drawings, forming a part of this specification, Figure 1 represents a top view of a portion of a heel-trimming machine embodying my improvements. Fig. 2 represents an end elevation of the same. Fig. 3 represents a section on line $x\,x$, Fig. 2. Fig. 4 represents a section on line $y\,y$, Fig. 1. Fig. 5 represents a rotary cutter-head, a perspective view of the knife-holder, and one of the knives. Fig. $5^a$ represents an end view of the knife-holder. Fig. 6 represents an end view of the cutter-head, one of the knives being shown in section. Fig. 7 is a detail plan view of one of the cutters and the counter-guard. Fig. 8 is an enlarged detail perspective view of the rand-trimmer guard.

The same letters of reference indicate the same parts in all the figures.

$a$ represents the standard or pedestal, having suitable bearings for the shaft $b$, that carries the heel-trimming cutter $c$, and for the shaft $d$, that carries the rand-trimming cutter $e$. The two cutters $c\,e$ are substantially alike in construction, differing only as to the form of their cutting-edges, so that a description of the cutter $c$ will suffice for both cutters. Said cutter $c$ is composed of two knives, 2 2, each molded on its outer surface to give the desired shape to the heel. Said knives are provided on their inner surfaces with dovetail segmental grooves 3, which fit upon the dovetail segmental ends of a holder composed of two sections, 4 4, which are formed on the ends of sleeves 5 6, and are attached to the end of the shaft $b$ by a clamping-screw, 7, which passes through the sleeve of the outer section and enters a tapped socket in the end of the shaft, the sleeve 5 of the outer section being formed to enter the sleeve 6 of the inner section, while said sleeve 6 is formed to receive the end of the shaft $b$, and is attached to the latter by a screw, 8, as shown in Fig. 3. The sections 4 4 stand side by side in contact with each other, and their inner sides are inclined or wedge-shaped, as shown in Fig. $5^a$, so that a slight independent rotary movement of the outer section will cause an increase or decrease in the thickness of the holder, as will be readily seen, so that after the knives are placed on the ends of the holder the latter may be widened by slightly turning the outer section, 4, thus causing the dovetail ends of the holder to bind against the sides of the dovetail grooves of the knives and hold the latter securely. The head of the clamping-screw 7 bears on the outer section, and when the screw is turned to place clamps the sections firmly. When the screw is loosened, the sections are released, so that the outer one may be moved, as described, to adjust the holder to the grooves of the knives.

The segmental ends of the holder-sections 4 4 are "backed off," or made slightly eccentric to the axis of rotation of the shaft $b$, so as to give the knives the necessary clearance or decrease in height from cutting-edge to heel.

9 represents a collar which surrounds the sleeve 6 of the inner holder-section, and is attached to said sleeve and to the shaft $b$ by the screw 8. Said screw passes through a peripheral slot, 12, in the collar 9, and its head clamps the collar and secures it firmly to the shaft. The collar is provided with two lugs or projections, 13, arranged to bear against the heels or rear ends of the knives to prevent the latter from slipping backward. The slot 12 in the sleeve enables it to be adjusted so that its lugs or knife-supports 13 can be moved to correspond with the adjustments of the knives as they are moved forward from time to time to compensate for wear of their cutting-edges. The knives 2 are formed to trim the heel from the rand edge to top lift. Each rand-trimming knife is formed with a lip to enter the rand-crease and trim the rand, as in other trimmers of this class.

14 represents a circular guard, formed to surround the rand-trimmer e. Said guard is attached to a sleeve, 15, which is fitted to a slide on a bearing, 16, in which the shaft d of the rand-trimmer rotates, and is prevented from rotating by a stud or spline, 17, in the sleeve entering a longitudinal groove, 18, in the bearing. The sleeve 15 is adapted to slide on the bearing 16, so as to cause the guard 14 to project over more or less of the rand-trimmer, and thus adapt the guard to different sizes of heels, the guard being secured in any position to which it may be adjusted by a set-screw, 19. The guard is formed to support the surface of the heel between the rand edge and top lift while the cutter is trimming the rand edge and heel-seat. An opening, 20, is formed in the guard to accommodate the top-lift portion of the heel.

21 represents a rest, formed to support the side of the heel at a point in front of and somewhat below the axis of the rand-cutter. Said rest is connected by a pivot, 25, to the guard 14, so that it is capable of swinging laterally, and can therefore swing out of the way when the shoe is in such position that the shank thereof would interfere with the rest if the latter were rigid. Heretofore rests located as here shown have in most instances been rigid, and have therefore prevented the free presentation to the cutter of the forward parts of the heel of a shoe having an abruptly-curved shank, as said shank is liable to strike the rest when the toe of the shoe is turned downwardly to present the forward portion of the heel to the cutter. By pivoting the rest so that it can swing laterally I avoid this difficulty.

The top lift of the heel is supported while the heel is being presented to the cutter by a top-lift rest formed with a narrow wall or face, 22, to support the edge of the top lift, and a wider wall or face, 23, to support the tread-surface of the top lift. The face 22 is formed on a ring, i, which surrounds the top-lift end of the cutter, and the face 23 is formed on a block or piece, j, to which the ring i is attached. The block or piece j is formed on or attached to a yoke, k, which is fitted to slide at right angles with the axis of the cutter-head and between guiding-ears l l on a sleeve, m, which is detachably secured to the bearing n, in which the shaft b rotates. The yoke k is provided with an adjusting-screw, o, which is engaged with the sleeve m, and by the rotation of said screw the yoke is moved in or out at right angles to the axis of the cutter-head, thus moving the top-lift rest in the same direction, said rest being thus adapted to operate with a cutter-head of any desired diameter. The sleeve m, by which the yoke is supported, is split and provided with ears q q, connected by a screw, r, which, when tightened, clamps the sleeve rigidly on the bearing n. When said screw is loosened, the sleeve m is capable of sliding endwise on said bearing, and thus moving the yoke and top lift in a direction parallel with the axis of the cutter-head. This adjustability of the top-lift rest adapts it to cutter-heads of different widths, while the previously-described adjustment adapts said rest to cutter-heads of different diameters.

r' represents a circular guard having a thin edge formed to surround the end of the cutter-head opposite the top-lift rest and to enter the rand-crease of the boot or shoe. Said guard is attached to a stud, s, which is fitted to both slide lengthwise and rotate in an adjustable bearing, t, secured to the supporting-frame by means which will be presently described, whereby said bearing may be adjusted either at right angles with the axis of the cutter or in line therewith to adapt the guard r' to different sizes of cutter-heads.

The stud s is adapted to play loosely endwise in the bearing t, so that the guard is free to move to a limited extent toward and from the top-lift rest, and is therefore adapted to conform to the variations in the width of a heel in which the rear portion is wider than the forward or side portions. The stud s has a head, s', which limits the independent movement of the guard toward the cutter-head by striking the end of the bearing t. Said bearing, being adjustable, as already stated, serves as an adjustable stop, which may be adjusted to differently-sized cutters.

The bearing t is formed on the end of a rod, u, which is held by a clamp, v, on a slide, w, which is movable in directions parallel with the axis of the cutter-head on suitable fixed guides on the supporting-pedestal. The clamp v is tightened to rigidly hold the rod and bearing u by a screw, a', in ears b' b' on said clamp. After loosening the screw a' the rod u, bearing t, and guard r may be adjusted at right angles with the axis of the cutter-head. The slide w may be adjusted by an adjusting-screw, d', to carry the clamp v, rod u, bearing t, and guard r in a direction parallel with the axis of the cutter.

The top-lift rest has a projection, e', at its lower portion, to which is pivoted a rest, 21, adapted to swing laterally like the rest 21 accompanying the rand-trimmer.

The dovetail-connection between the knives and the holders therefor is shown and described in an application for patent filed by me on September 24, 1888, Serial No. 286,250; and hence I make no claim thereto in this case.

I claim—

1. A heel-trimming cutter-head composed of the holder made in two sections or parts having segmental ends, the inner section being affixed to a rotary shaft, a clamp whereby the outer section may be released for adjustment and secured, and molded segmental knives having grooves on their inner surfaces formed to receive the segmental end of the sectional holder, the adjacent sides of said sections being beveled, whereby the adjustment of the outer section is caused to vary the thickness of the holder, as set forth.

2. In a heel-trimming cutter, the combination of the holder made in two sections, the inner one of which is secured to a rotary shaft, while the other is secured by a movable clamp, said sections having segmental ends and beveled inner sides, molded segmental knives having grooves in their inner surfaces formed to receive the segmental ends of the holder, and a collar adjustably secured to said shaft and provided with stops or lugs formed to bear on the heels or rear ends of the knives, as set forth.

3. In a heel-trimming cutter, the combination of the holder made in two sections secured, as described, to a rotary shaft and having beveled inner faces and segmental outer ends eccentric to the axis of the shaft, with the segmental knives having parallel inner and outer surfaces and provided with grooves in said inner surfaces formed to receive the segmental ends of the holder, the knives being adjustable on the holder, as described, and given the requisite clearance by the eccentricity of the ends of the holder.

4. The combination, with a rotary cutter supported in fixed bearings, of the top-lift rest having walls or faces 22 23, the ring $i$, surrounding said cutter, the adjustable yoke supporting said rest at right angles to said cutter, and the sleeve supporting and guiding said yoke and adjustably mounted on a fixed bearing of the cutter-shaft, substantially as described.

5. In a heel-trimming machine, the combination, with a rotary cutter, of an arm or support arranged in front of the axis of the cutter, and a rest, 21, pivoted at its inner end to said support and arranged to stand at right angles with the axis of the cutter as a support for the side of the heel, said rest being adapted by its pivotal connection to swing out of place and thereby avoid the shank of a boot or shoe sole, as set forth.

6. In a heel-trimming machine, the combination of a rand-trimming cutter and a guard, 14, formed to cover said cutter, the sleeve 15, adapted to slide on a bearing, 16, and a stud or spline, 17, for preventing the rotation of said guard, substantially as shown and described.

7. The combination of a rand-trimming cutter, the guard 14, formed on a slide, 15, and provided with the opening 20 to accommodate the top-lift end of the heel, and means, substantially as described, for adjustably securing said sleeve, as set forth.

In testimony whereof I have signed my name to this specification, in the presence of two subscribing witnesses, this 18th day of February, A. D. 1888.

FRANK N. ETHRIDGE.

Witnesses:
C. F. BROWN,
A. D. HARRISON.